US005771032A

United States Patent [19]
Cline et al.

[11] Patent Number: 5,771,032
[45] Date of Patent: Jun. 23, 1998

[54] METHOD, SYSTEM, AND MEMORY FOR MODIFYING A WINDOW AS INFORMATION IS BEING SCROLLED

[75] Inventors: Troy Lee Cline, Cedar Park; Scott Harlan Isensee, Georgetown; Ricky Lee Poston; Jon Harald Werner, both of Austin, all of Tex.

[73] Assignee: International Business Machines Corporation, Armonk, N.Y.

[21] Appl. No.: 315,742

[22] Filed: Sep. 30, 1994

[51] Int. Cl.⁶ .................................................. G09G 5/00
[52] U.S. Cl. ........................................ 345/127; 345/123
[58] Field of Search .................................. 395/157, 158; 345/118–123, 127

[56] References Cited

U.S. PATENT DOCUMENTS

| | | |
|---|---|---|
| 4,704,694 | 11/1987 | Czerniejewski . |
| 4,723,210 | 2/1988 | Barker et al. . |
| 4,723,211 | 2/1988 | Barker et al. . |
| 4,829,470 | 5/1989 | Wang . |
| 4,868,785 | 9/1989 | Jordan et al. . |
| 5,121,478 | 6/1992 | Rao . |

OTHER PUBLICATIONS

User–Friendly Graphical Interface for Window Management Using Reference Frames, IBM Technical Disclosure Bulletin, vol. 37, No. 5, May 1994, pp. 235–238.

*Primary Examiner*—Ulysses Weldon
*Attorney, Agent, or Firm*—Diana L. Roberts

[57] ABSTRACT

A method, system, and memory for reshaping a window using a drop-down scroll bar are provided. The method includes the step of dynamically reshaping the frame of a window around information within the window in accordance with a preference setting and in response to scrolling the information using a drop-down scroll bar. The system includes a display for displaying the window, a processor, and, in response to a command from user controls means for controlling the processor to reshape the frame of the window around information within the window as the information is being scrolled. The memory includes computer readable program code that is stored in the memory. The computer readable program code provides instructions for reshaping the frame of a window around information that is being scrolled in that window.

19 Claims, 6 Drawing Sheets

PRIOR ART

METHOD, SYSTEM, AND MEMORY FOR MODIFYING A WINDOW AS INFORMATION IS BEING SCROLLED

CROSS-REFERENCES TO RELATED APPLICATIONS

The present application is related to copending patent application entitled "METHOD, SYSTEM, AND MEMORY FOR MODIFYING WINDOWS", filed Sep. 30, 1994 (concurrently with the present application), IBM attorney docket number AT9-94-170, Ser. No. 08/315,664, hereby incorporated by reference.

BACKGROUND OF THE INVENTION

1. Field of the Invention

The present invention relates generally to graphical user interfaces (GUIs) of operating systems and application programs and, more particularly, but without limitation, to a method and system for dynamically modifying windows as information is being scrolled on the window.

2. Background Information and Description of Related Art

A computer workstation requires an operating system to manage and direct workstation objects during the performance of workstation tasks, such as adding/deleting users, printing, storing/retrieving data, adding/removing peripherals, etc. Before the performance of a workstation task, the user typically must access the operating system and input a command that directs the operating system to perform the desired task. Graphical user interfaces ("GUIs") provide an interface between a user and the operating system. GUIs typically represent objects (e.g. documents, printers, hard drives, programs, etc) as icons on a display screen. These icons may be individually opened as windows to show attributes of the object.

Figure 1:
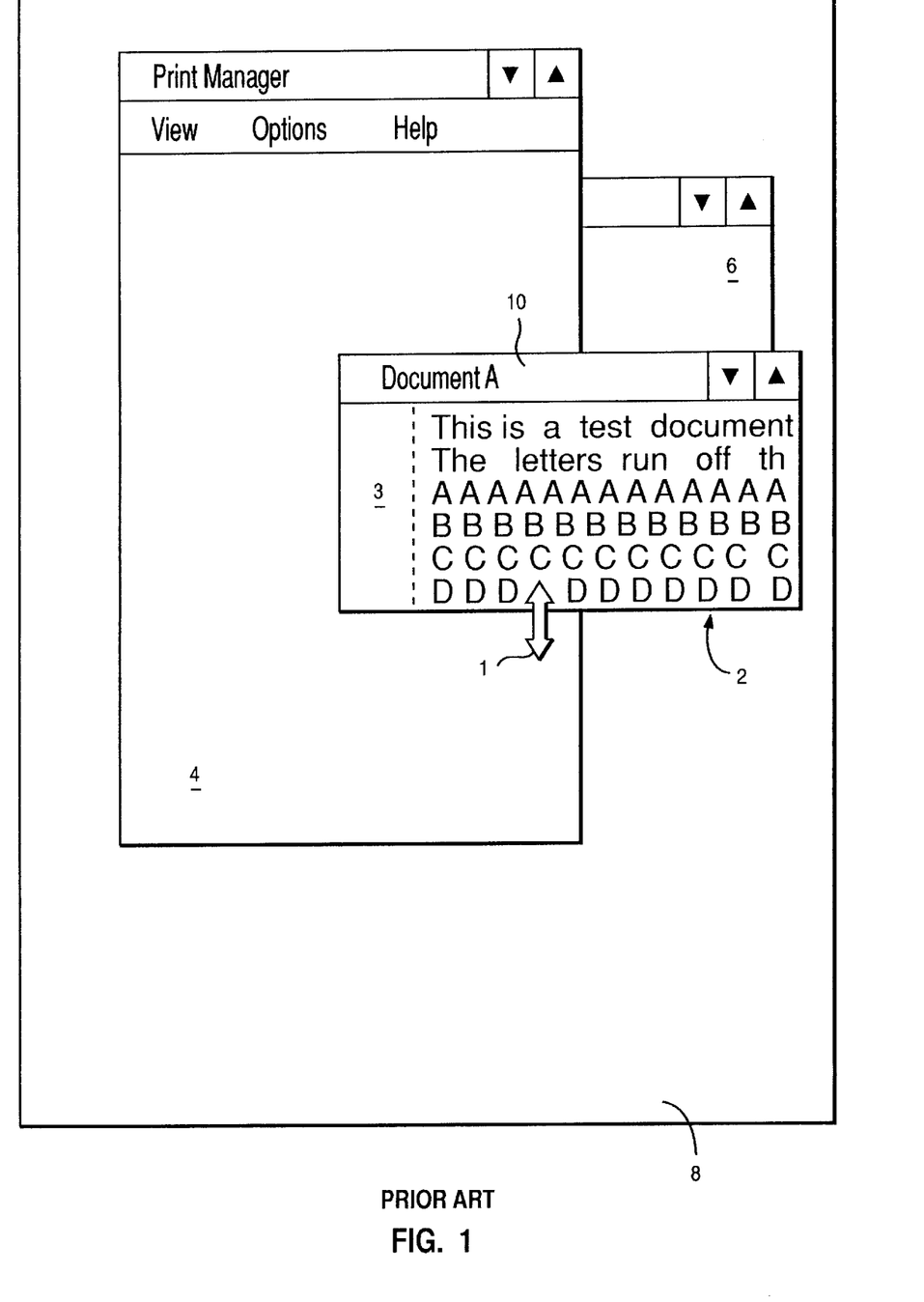
FIG. 1 illustrates a prior art pictorial view of multiple, stacked windows.

FIG. 1 illustrates a prior art, pictorial view of multiple stacked windows. Computer display screen 8 concurrently displays windows 2, 4, and 6. Window 2 is "stacked on" (i.e. positioned over) window 4, which is stacked on window 6. Window 2 includes the frame that surrounds the window, title bar 10 (which indicates that the window contains a document), margin 3, and the text in the document. The text in window 2 cannot be fully viewed because the window has been reduced in size.

A user frequently desires to selectively resize each stacked window so that it is as small as possible, but still displays its full contents. For example, the user may desire to simultaneously view the contents of all the opened windows by making each window as small as possible. Using a GUI, the user can manipulate the horizontal and vertical size and arrangement of the windows. That is, the user can manipulate the size and/or position of a window on the screen. For example, to manipulate the vertical size and/or position of window 2, the user first positions mouse cursor 1 over the bottom frame edge of window 2 (see FIG. 1), presses a mouse button (not shown), and then drags the mouse cursor upward or downward to adjust the position of the bottom frame edge of window 2. The user can also drag the top frame edge of window 2. Further, in a similar fashion, the user can adjust the horizontal size and/or position of window 2.

If window 2 is horizontally resized, left margin 3 remains. However, the size of margin 3 will be proportionally reduced or increased according to the horizontal size reduction or increase, respectively. If the right frame edge is positioned closer to the left frame edge (i.e. reduced in size), even less of the text can be viewed by the user. Similarly, If the bottom frame edge is positioned closer to the top frame edge, even less of the text can be viewed by the user. Therefore, when windows are selectively reduced in horizontal and vertical size, their contents cannot be entirely seen.

Accordingly, there is a need for a technique that enables a user to dynamically modify the shape of a window so that the window is the smallest possible size, yet continues to display its contents. This technique should be capable of scrolling the contents of the window, while continuing to reshape the window around the contents so that the window is the smallest possible size, but continues to display its full contents.

SUMMARY OF THE INVENTION

It is an object of the present invention to provide a method, memory, and system for changing the display of information in a window using a drop-down scroll bar. The method includes the step of dynamically reshaping a window around information within the window in accordance with a preference setting and in response to scrolling the information on the window using a scroll bar.

The system includes a display for displaying the window, a processor, and, in response to a command from user controls, means for controlling the processor to reshape the window around information within the window as the information is being scrolled.

DETAILED DESCRIPTION OF THE PREFERRED EMBODIMENTS

The following detailed description is of the best presently contemplated mode for carrying out the invention. This detailed description is not to be viewed in a limiting sense, but is made merely for the purpose of illustrating the general principles of the invention, the scope of which is only defined by the appended claims.

The preferred embodiment of the present invention includes a system, method, and memory for reshaping the frame of a window as information is being scrolled on the window. The preferred embodiment forms part of an enhanced graphical user interface (GUI) utilized by a user to access an operating system in the management and direction of workstation operations. More specifically, the preferred embodiment is implemented within the Window Manager, which is part of the GUI that interfaces with the AIX™ operating system. However, one skilled in the art will readily recognize that the present invention could be implemented in any operating system desktop or graphical user interface of an application program.

Figure 2:
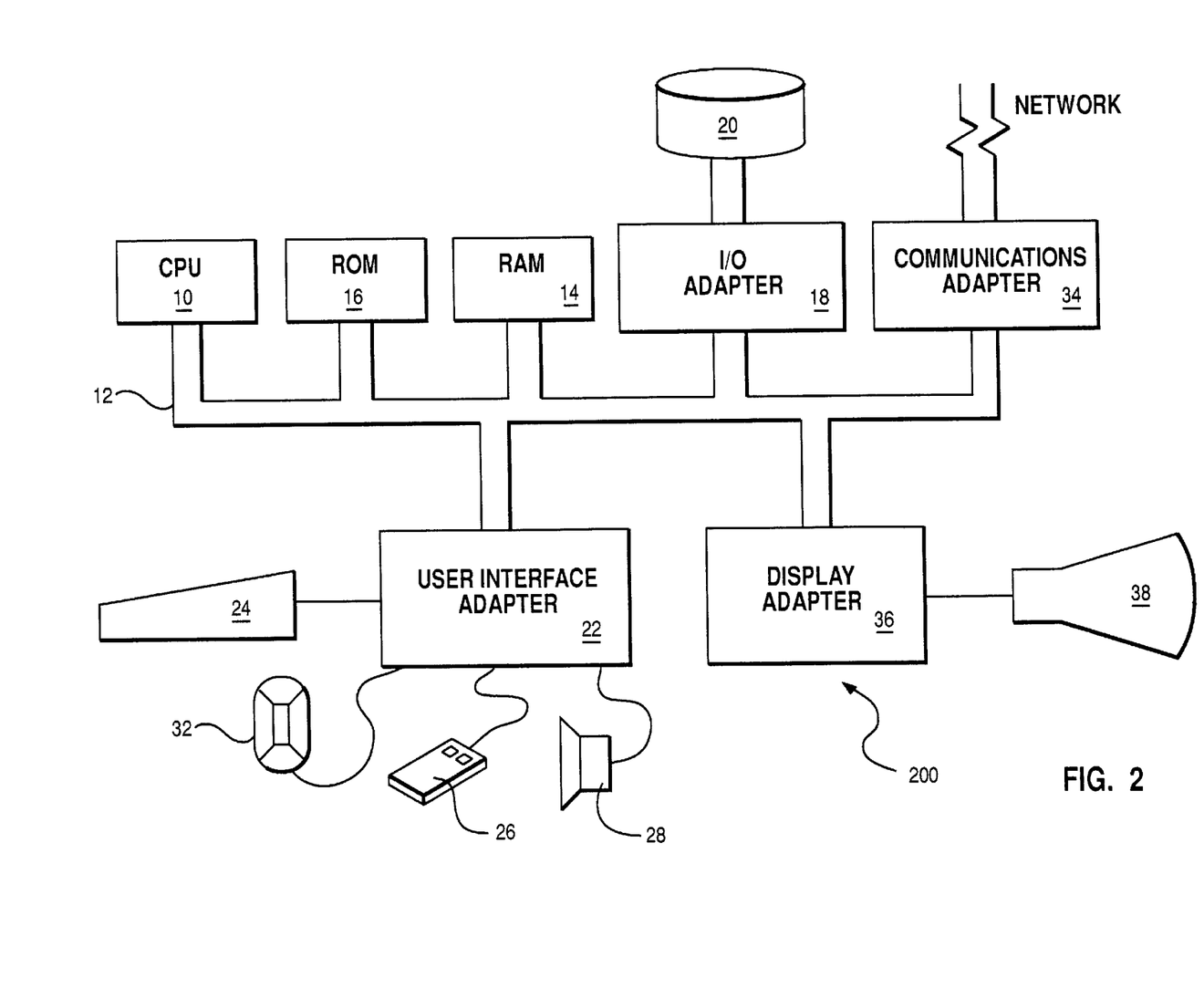
FIG. 2 is a schematic diagram of representative hardware for use with the present invention.

The present invention may be practiced in any suitable hardware configuration, such as the hardware configuration illustrated in FIG. 2, or, alternatively, a laptop computer. Referring to FIG. 2, workstation 200 includes any suitable central processing unit 10, such as a conventional microprocessor (e.g., Intel's™ Pentium™ or IBM's™ PowerPC™), and a number of other units interconnected via system bus 12. Illustratively, workstation 200 includes random access memory ("RAM") 14, read only memory ("ROM") 16, display adapter 36 for connecting system bus 12 to display device 38, and I/O adapter 18 for connecting peripheral devices (e.g. disk and tape drives 20) to system bus 12. Workstation 200 further includes user interface adapter 22 for connecting keyboard 24, mouse 26, speaker 28, microphone 32, and/or other user interface devices, such as a touch screen device (not shown), to system bus 12. Communication adapter 34 connects workstation 200 to a data processing network.

The enhanced GUI, as computer readable program code, resides within a machine-readable media (e.g., memory) to direct the operation of workstation 200. Any suitable memory may retain the GUI, such as RAM 14, ROM 16, a magnetic diskette (e.g., floppy diskette), CD-ROM, magnetic tape, or optical disk (the last four being located in disk and tape drives 20). While the specification describes the GUI as performing the features of the invention, in actuality, the GUI merely provides the instructions for the microprocessor to perform those features.

Figure 3:
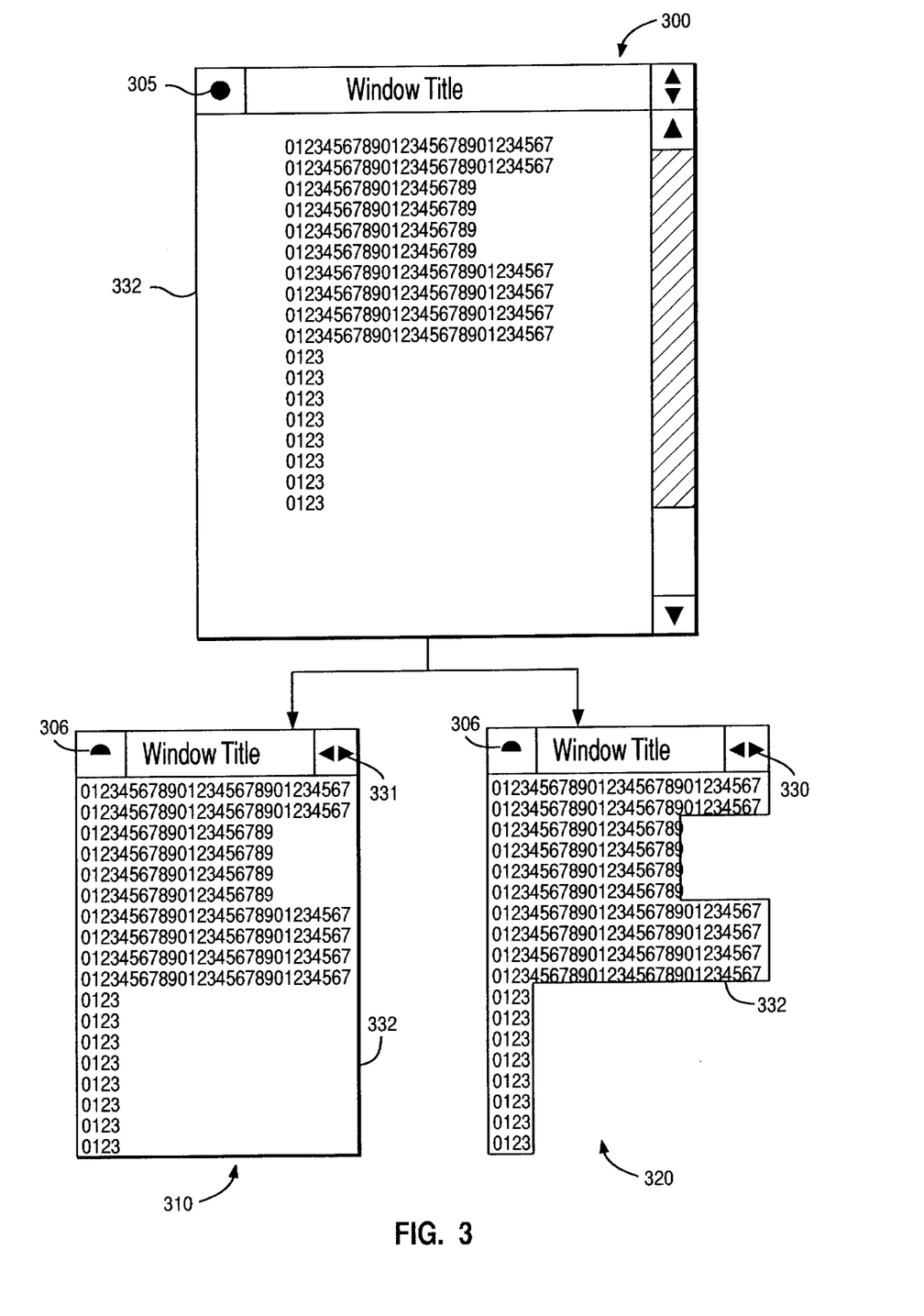
FIG. 3 is a pictorial view of resizable windows according to the present invention.

Referring to FIG. 3, multiple stacked windows can each display information (e.g. text, graphics, icons). In this example, a text processing application (e.g. word processor, spreadsheet, database) is running within window 300. Alternatively, any suitable application could run within window 300. In a first embodiment, the GUI allows a user to dynamically reshape the window frame of window 300 around each line of text (referred to as the "shrink wrap" mode), as shown in window 320. As such, only the window frame, title bar, menu bar, and text of window 320 can be viewed because the GUI removes all empty space in the client space, such as left and right margins and blank lines at the beginning and end of the text (e.q. top and bottom margins) from the window.

Scroll bar icon 330 enables the GUI to display (or hide) a drop-down scroll bar (described herein, see FIG. 6) so that the user can scroll text (e.g. information) within window 320. In response to scrolling text, the GUI dynamically reshapes window frame 332 around each line of text as it is scrolled. Reshaper icon 306 allows the user to reshape window frame 332 of window 320 to its original state (i.e. window 300).

In a second embodiment, the GUI reshapes window frame 332 of window 300 in a rectangular fashion around the text (e.g. information) according to the most significant horizontal and most significant vertical text positions, as shown in window 310 (referred to as the "min X/Y mode"). As such, the window frame, title bar, menu bar, and text of window 310 are viewed. However, the GUI removes some empty (e.g.. white) space, such as left and right margins and blank lines at the beginning and end of the text (e.g. top and bottom margins) from the window.

Scroll bar icon 331 enables the GUI to display (or hide) a drop-down scroll bar so that the user can scroll information (e.g. text, icons, etc.) within window 310. In response to scrolling text, the GUI dynamically reshapes window frame 332 around the most significant vertical and most significant horizontal text positions as the information is scrolled. Reshaper icon 306 allows the user to reshape window frame 332 of window 310 to its original state (i.e. window 300).

FIG. 3 illustrates reshaper icon 305. which is positioned in the title bar of window 300. Alternatively, reshaper icon 305 may be positioned anywhere in the window. Any suitable pointing device, such as a mouse, may be used to position a mouse cursor over reshaper icon 305. In the preferred embodiment, one click of a first button on the mouse activates reshaper icon 305. Upon activating reshaper icon 305, the shape of that window on the display screen transforms to the shape of the prior setting (referred to as the "reshape preference setting"), which is either the shrink wrap mode (see window 310) or the min x/y mode (see window 320).

Figure 4:
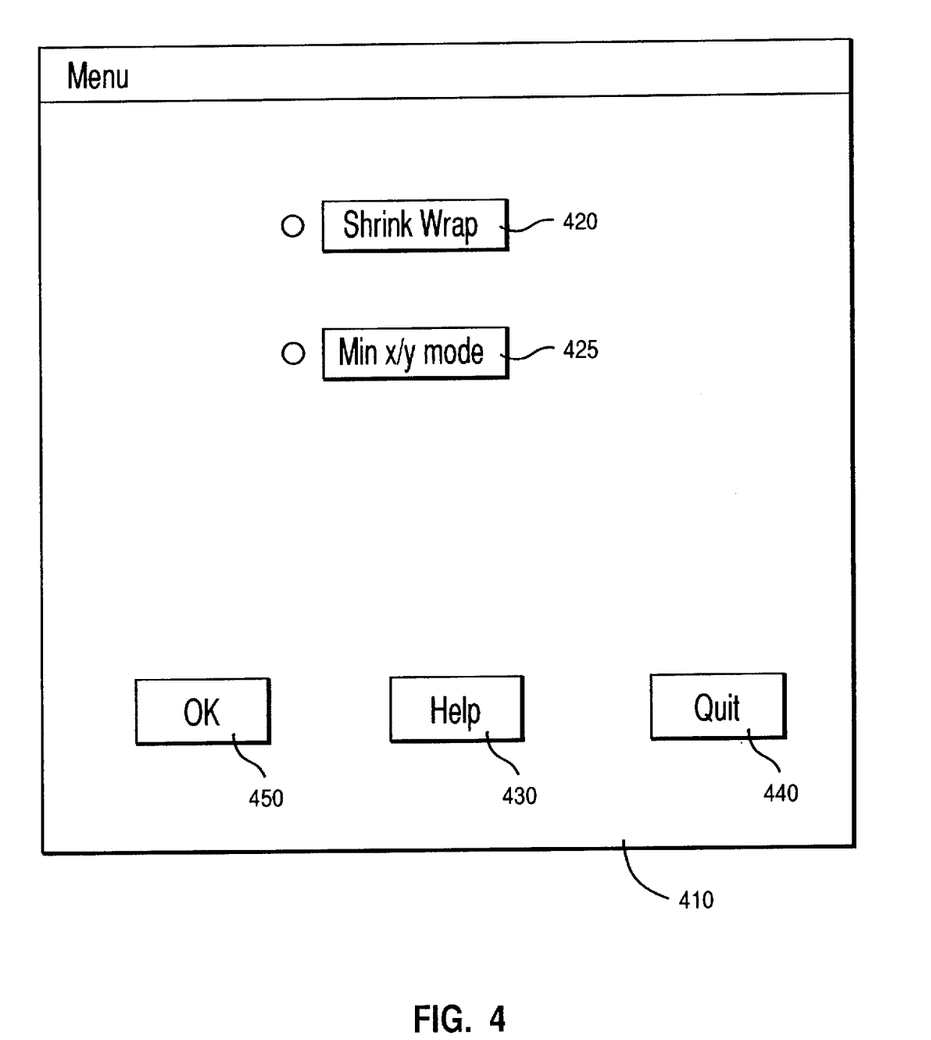
FIG. 4 is a menu for setting the reshape preference setting.

If the user desires to change the reshape preference setting, the user positions the mouse cursor over reshape icon 305 and clicks the second button on the mouse. In response, menu 410 appears. Using the mouse, the user may select shrink wrap button 420, min x/y button 425, help button 430, or quit button 440. If the user selects quit button 440, menu 410 disappears and the reshape preference setting remains unaltered. Help button 430 provides a dialogue (not shown) with instructions on how to operate reshape icon 305. Once the user has selected shrink wrap button 420 or min x/y button 425, the user may save the preference setting in a database table (not shown) within the GUI for that window by selecting OK button 450.

Figure 5:
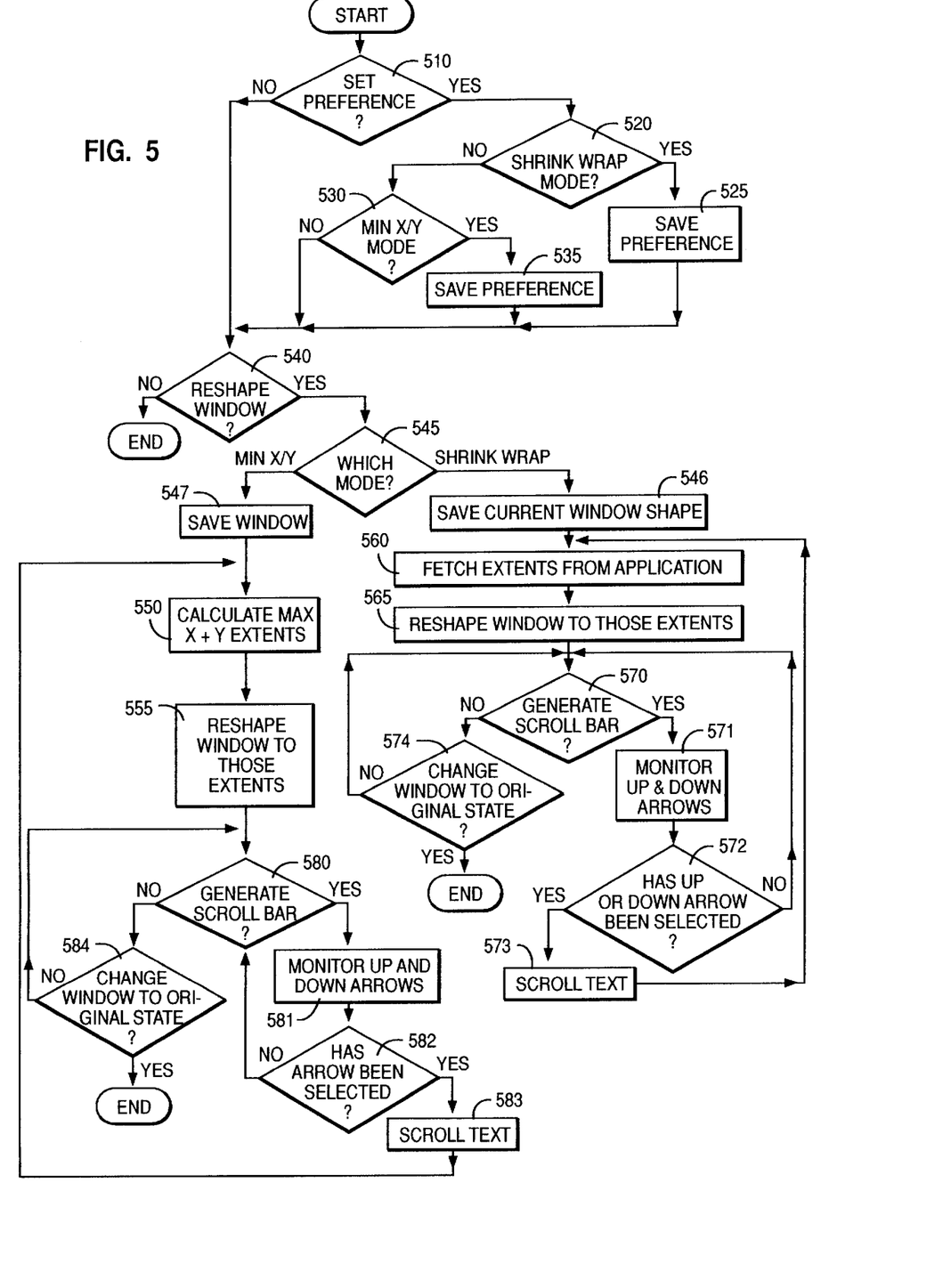
FIG. 5 is a flow chart of the reshaping function according to the present invention.

FIG. 5 illustrates a flow chart for reshaping a window according to the preferred embodiment. Referring to FIGS. 3, 4 and 5, at 510, a determination is made as to whether the user desires to change the reshape preference setting. In the preferred embodiment, the GUI automatically sets the reshape preference setting to the shrink wrap mode. If the user desires to change this state, he/she does so by positioning the mouse cursor over reshape icon 305 and clicking the second mouse button. In response, the GUI presents menu 410 to the user who, in turn, makes a selection at 520 or 530 as to which mode is desired. The selected mode, if any, is saved in the database table within the GUI at either 525 or 535, respectively. This database table contains all information for reshaping the particular window.

A determination is made at 540 as to whether the user desires to reshape the window.. The user does this by positioning the mouse cursor over reshape icon 305 and clicking the first mouse button. If done, at 545, the GUI retrieves the last shape setting (e.g. state) from the database table within the GUI for that particular window.

If the last setting was the shrink wrap mode, at 546, the GUI saves a copy of the current window shape state in the database table and, at 560, retrieves (e.g. initiates a fetch) for the extents of the application running in the window. To do this, the operating system scans each of the lines in the application for the two most extreme character positions within each line. That is, the operating system scans each line for the left most and right most character positions. Alternatively, any suitable conventional application, such as Common Desktop Environment™ or CorelDraw™, could provide the GUI with the extents information.

At 565, the GUI adjust the left most and right most vertical frame position (e.g. vertical frame segment) for each line of the window to those left most and right most character positions plus one position, respectively. All empty lines at the beginning and end of the text (e.g. top and bottom margins) are removed from the window The GUI then horizontally connects each vertical frame segment. The scroll bar function will be described herein.

Alternately, if the last state was the min X/Y mode, at 547, the GUI saves the current window state in a database for that window and, at 550, retrieves (e.g. initiates a fetch) for the extents of the application running in the window. To do this, the operating system scans each of the lines and records the two most extreme character positions within that line. That is, the operating system scans each line for the left most and right most character position and stores those two character positions in a database list. The operating system then examines the database list for the most extreme left position and the most extreme right position of any one line within the application.

At 555, the GUI dynamically and uniformly adjusts the left and right vertical frame positions to the most extreme left position plus one position and the most extreme right position plus one position, respectively. The GUI then horizontally connects the left most and right most vertical frames. The scroll bar function will be described herein.

Figure 6:
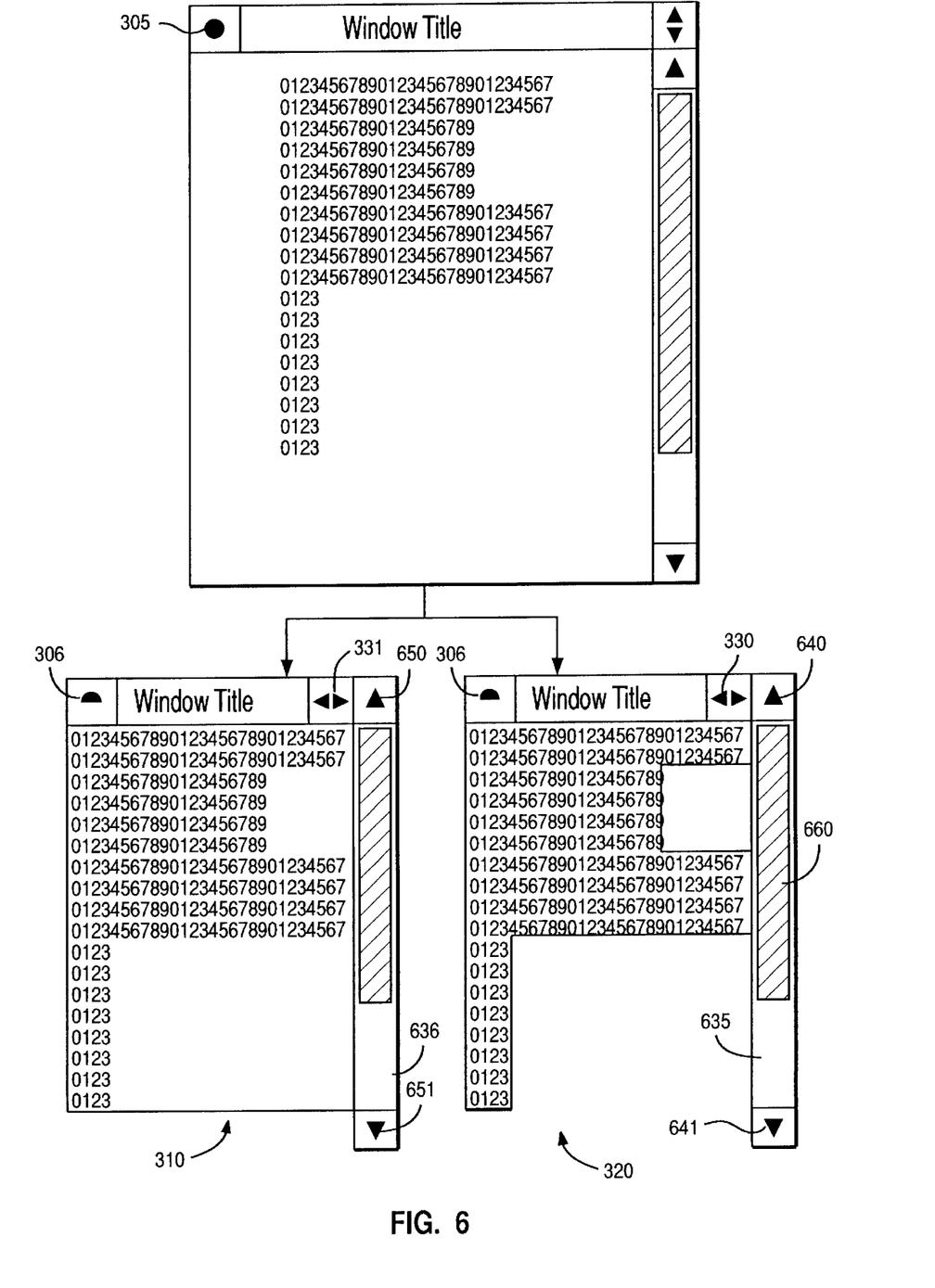
FIG. 6 is a pictorial view of the resizable windows of FIG. 3 showing the scroll bar feature according to the present invention.

FIG. 6 is a pictorial view of the resizable windows of FIG. 3, showing the scroll bar feature according to the preferred embodiment. Referring to FIGS. 5 and 6, after reshaping the window at 565 to the shrink wrap mode, at 570, the user makes a determination as to whether he/she desires to scroll the text in the window. If not desired, at 574, a determination is made as to whether the user desires to change the window back to the original state. To do this, the user selects reshaper icon 306. In response, the GUI searches the database table for that window and retrieves the saved original version of the window. Otherwise, control returns to 570.

If the user desires to scroll the text in the window, any suitable pointing device, such as a mouse, may be used to position the mouse cursor over scroll bar icon 330. Over the icon, one click of a first button on the mouse causes the GUI to display drop-down scroll bar 635. Scroll bars are well known to those skilled in the art. The length of slider 660 informs the user about the length of the information exists that cannot be viewed in window 320. At 571, the GUI monitors up and down arrows 640 and 641 of scroll bar 635. At 572, a determination is made as to whether up arrow 640 or down arrow 641 has been selected. If not selected, control returns to 570, where the GUI determines if the left arrow number of scroll bar icon 330 has been selected. If the left arrow has been selected, the GUI removes scroll bar 635 from window 320.

If either up arrow 640 or down arrow 641 of scroll bar 653 has been selected, at 573, the GUI scrolls the application either up or down, depending on whether the up or down arrow was selected. Control then returns to 560 where the GUI begins the process of reshaping the window.

Alternatively, again referring to FIGS. 5 and 6, after reshaping the window at 555 to the min x/y mode at 580, the user makes a determination as to whether he/she desires to scroll the text in the window. If not desired, at 584, a determination is made as to whether to change the window back to the original state. To do this, the user selects scroll bar icon 306 of window 310. In response, the GUI searches the database for that window and retrieves the saved original version of the window. Otherwise, control returns to 580.

If the user desires to scroll the text in window 310, any suitable pointing device, such as a mouse, may be used to position the mouse cursor over scroll bar icon 331. One click of a first button on the mouse causes the GUI to display scroll bar 636. At 581, the GUI monitors up and down arrows 650 and 651 of scroll bar 636. At 582, a determination is made as to whether either up arrow 650 or down arrow 651 has been selected. If not selected, control returns to 580, where the GUI determines if the left arrow of scroll bar icon 331 has been selected. If the left arrow has been selected, the GUI removes scroll bar 636 from window 310.

If either up arrow 650 or down arrow 651 of scroll bar 636 has been selected, at 583, the GUI scrolls the application either up or down depending on whether the up or down arrow was selected. Control then returns to 550 where the GUI begins the process of reshaping the window.

One embodiment is further illustrated by the following code:

```
Preference setting selection:
If Shrink wrap mode selected then
    set WINDOWMODE = SHRINK;
Else
    If Min X/Y mode selected then
        set WINDOWMODE = MINXY;
    Endif;
Else
    . . . process other preferences available . . .
    Endif;
Window Mode Change:
    If (WINDOWMODE = SHRINK) then
        Scan application for extents from every line;
        Determine windows shape from extents received from
        operating system;
    Execute Reshape/Resize event processing;
    Else
    If (WINDOWMODE = MINXY) then
        Scan application for extents;
        Determine the most extreme left and most extreme right
            positions;
        Determine windows shape from the most extreme positions;
        Execute Reshape event processing,
    Endif;
Endif;
Reshape/Resize:
    Unmanage window to prevent partial redrawing;
    Adjust window shape and or size according to extents passed;
    If scroll bar needed then create scroll bars;
    Endif;
Manage window to redraw new shape/size;
```

The scroll bar process and an alternative embodiment is described by the following code:

```
Window Mode Change:
IF (application responds to window change protocol)
THEN
    add "Change Size" menu item to the window manager
    pulldown menu;
END IF
IF (Change Size is selected and the option is to
SHRINK) THEN
    send GET_EXTENTS message to application:
    application will then respond with a set of
        extents for the new window size;
    create a region (union of rectangles built using
        the extents);
    use this region as the new window for the
        application;
    send a refresh to the application so that it will
        redraw itself within the new window;
ELSE
IF (Change Size is selected and the option is to
MINIMIZE XY) THEN
    send GET_MINXY message to application;
    application will then respond with a set of
        extents for the new_window size;
    create a region (union of rectangles built using
        the extents);
    use this region as the new window for the
        application;
    send a refresh to the application so that it will
        redraw itself within the new window;
```

```
                    -continued
    END IF
Drop-Down scroll bars:
    IF (preference is to use drop-down scroll bars) THEN
        IF (application is using scroll bars within its
        parent window) THEN
            provide addition glyph in the window
                decorations for toggling the
                display/removal of the scroll bars
                used by the parent window;
        END IF
        IF (scroll bars not displayed and glyph is
        selected) THEN
            trigger the display of the vertical and/or
                horizontal scroll bars based on the
                current needs of the application;
        ELSE
        IF (scrollbars are displayed and glyph is
        selected) THEN
            trigger the removal of the vertical and/or
                horizontal scroll bars;
        END IF
    END IF
```

While the invention has been shown and described with reference to particular embodiments thereof, it will be understood by those skilled in the art that the foregoing and other changes in form and detail may be made therein without departing from the spirit and scope of the invention. For example, a horizontal scroll bar, in addition to the vertical scroll bar, could be provided for horizontal reshaping of a window as information is scrolled horizontally.

We claim:

1. A method for directing a computer system, having at least a processor, display and user controls, to reshape at least one window displayed on the display, the window having information displayed therein, wherein the information is generated by an application executing in the window, comprising the step of:

in response to the information in the window being scrolled such that the information moves in a vertical direction upward or downward, dynamically reshaping the window around the information as it is being scrolled and in accordance with a preference setting.

2. The method according to claim 1 further comprising the step of:

dynamically reshaping the window around the information in the window as it is being scrolled in response to a command from the user controls.

3. The method according to claim 2 further comprising the step of:

adjusting the preference setting.

4. The method according to claim 3 wherein said adjusting step comprises the steps of:

displaying a reshape adjustment dialog having a plurality of mode buttons; and selecting one of the mode buttons to adjust the preference setting.

5. The method according to claim 4 wherein said step of displaying a reshape adjustment dialog comprises the steps of:

displaying a shrink wrap button and a min x/y button; and selecting the shrink wrap button or the min x/y button using the user controls.

6. The method according to claim 2 further comprising the step of:

activating a scroll bar using the user controls to initiate said dynamic reshaping step; and scrolling the information up or down in the window by activating the scroll bar.

7. The method according to claim 1 wherein said step of dynamically reshaping the window comprises the following steps:

in response to the information being scrolled at least one line upward or downward in the window, determining a left most and a right most position for each line of the information;

adjusting a left vertical frame edge of the window to the left most position plus one left position for each corresponding line of information, and a right vertical frame edge of the window to the right most position plus one right position for each corresponding line of information, thereby forming left and right vertical frame segments; and horizontally connecting each left vertical frame segment and horizontally connecting each right vertical frame segment, thereby reshaping the window around the information displayed therein.

8. The method according to claim 1 wherein said step of dynamically reshaping the window comprises the following steps:

in response to the information in the window being scrolled at least one line upward or downward, determining a most extreme left position and a most extreme right position of the information displayed in the window; and adjusting a left vertical frame edge of the window to the most extreme left position plus one left position and a right vertical frame edge of the window to the most extreme right position plus one right position; and horizontally connecting the left vertical frame edge to the right vertical frame edge, thereby reshaping the window around the information displayed therein.

9. A system for reshaping at least one window having information, generated by an application executing within the window, displayed therein, comprising:

a processor;

a display for displaying the window and the information;

user controls; and in response to a command from the user controls to scroll the information diplayed in the window using a scroll bar, such that the information moves vertically upward or downward, means for dynamically reshaping the window around the information in accordance with a preference setting.

10. The system according to claim 9 further comprising means for adjusting the preference setting.

11. The system according to claim 10 wherein said means for adjusting comprises:

said display for displaying a reshape adjustment dialog having a plurality of mode buttons on said display; and said user controls for selecting one of the mode buttons to adjust the preference setting.

12. The system according to claim 11 wherein said means for displaying a reshape adjustment dialog comprises:

said display for displaying a shrink wrap button and a min x/y button; and said user controls for selecting the shrink wrap button or the min x/y button.

13. The system according to claim 9 further comprising:

said user controls for activating a scroll bar to initiate said means for dynamically reshaping.

14. The system according to claim 9 wherein said means for dynamically reshaping the window comprises:

in response to the information in the window being scrolled at least one line upward or downward, means for determining a left most and a right most position for each line of the information;

means for adjusting a left vertical frame edge of the window to the left most position plus one left position for each corresponding line of information, and adjusting a right vertical frame edge of the window to a right most position plus one right position for each corresponding line of information, thereby forming left and right vertical frame segments; and means for horizontally connecting each left vertical frame segment and for connecting each right vertical frame segment to reshape the window.

15. The system according to claim 9 wherein said means for dynamically reshaping the window comprises:

in response to the information in the window being scrolled at least one line upward or downward, means for determining a left most and right most position for each line of the information;

means for storing the left most and right most positions for each displayed line of information in a list;

means for examining the list to locate a most extreme left position and a most extreme right position of the information;

means for adjusting a left vertical frame edge of the window to the most extreme left position plus one left position and a right vertical frame edge of the window to the most extreme right position plus one right position; and means for horizontally connecting the left vertical frame edge to the right vertical frame edge.

16. A memory for storing computer readable code for access by a program being executed on a computer system, the computer system having at least a processor, display and user controls, comprising:

computer readable program code stored in said memory for reshaping a window displayed on the display around information displayed within the window as the information is scrolled vertically upward or downward and in accordance with a preference setting.

17. The memory according to claim 16 wherein said computer readable program code comprises:

in response to the information in the window being scrolled at least one line upward or downward, means for determining a left most and a right most position for each line of the information;

means for adjusting a left vertical frame edge of the window to the left most position plus one position for each corresponding line of information, and a right vertical frame edge of the window to the right most position plus one right position for each corresponding line of information, thereby forming left and right vertical frame segments; and means for horizontally connecting each left vertical frame segment and connecting each right vertical frame segment to reshape the window.

18. The memory according to claim 16 wherein said computer readable program code comprises:

in response to the information in the window being scrolled at least one line upward or downward, means for determining a most extreme left position and a most extreme right position of the information;

means for adjusting a left vertical frame edge of the window to the most extreme left position plus one left position and a right vertical frame edge of the window to the most extreme right position plus one right position; and means for horizontally connecting the left vertical frame edge to the right vertical frame edge.

19. A method for directing a computer system, having at least a processor, display and user controls, to reshape at least one window displayed on the display, the window having lines of information displayed therein, wherein the information is being generated by an application executing within the window, comprising the steps of:

in response to the information being scrolled at least one line upward or downward within the window using a scroll bar, such that each line of information moves upward or downward within the window, determining a left most position and a right most position for each displayed line of the information;

adjusting a left vertical frame edge of the window to the left most position plus one left position for each corresponding displayed line of information, and a right vertical frame edge of the window to the right most position plus one right position for each corresponding displayed line of information, thereby forming left and right vertical frame segments; and horizontally connecting each left vertical frame segment and horizontally connecting each right vertical frame segment to reshape the window around each displayed line of information.

* * * * *